INVENTORS
RALPH J. THOMPSON &
CLEMENT T. LOSHING
BY Williams, Tilbury & Gobrick

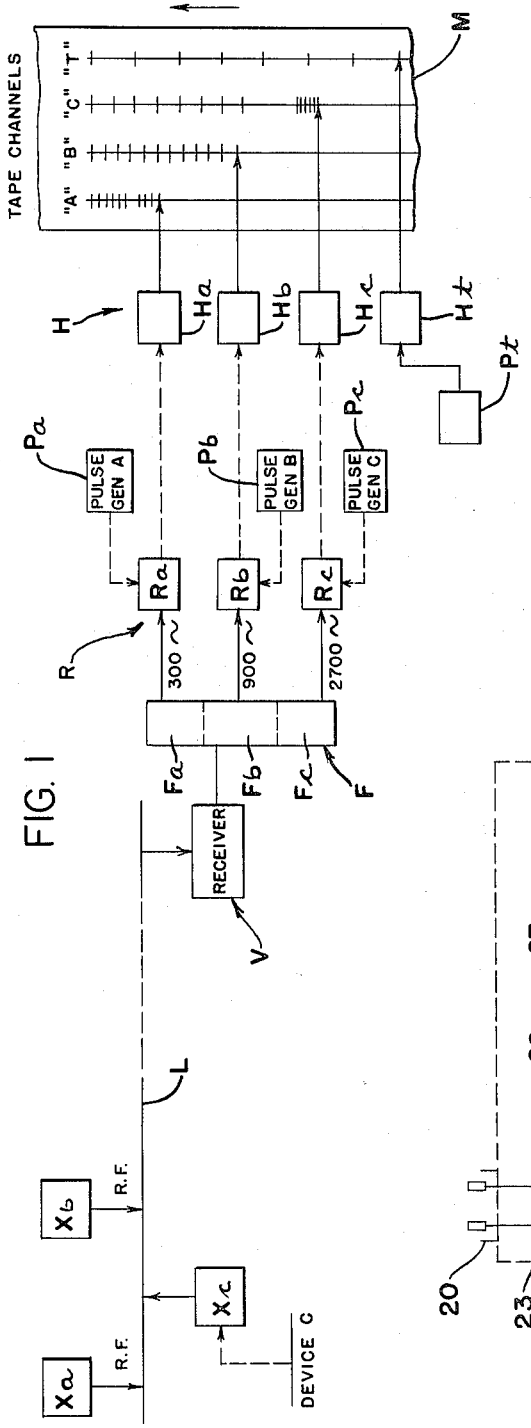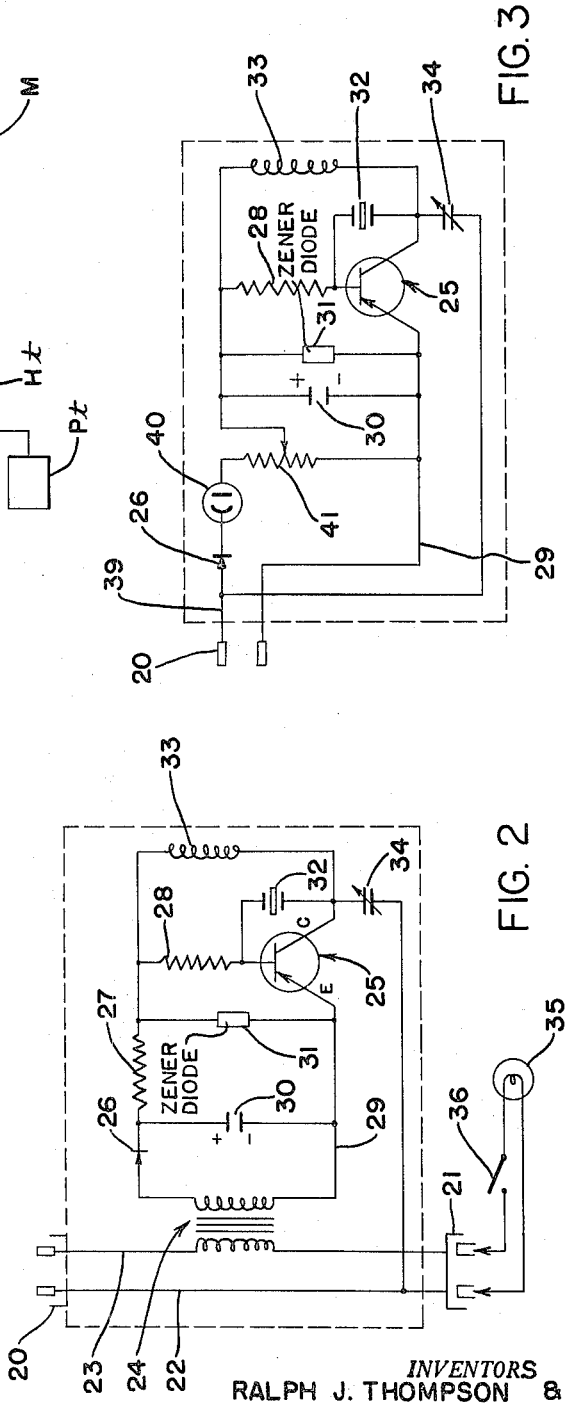

ATTORNEYS

United States Patent Office 3,229,300
Patented Jan. 11, 1966

3,229,300
DATA GATHERING AND RECORDING SYSTEM
Ralph J. Thompson and Clement T. Loshing, both of Box 5000, Cleveland 1, Ohio
Filed Jan. 31, 1961, Ser. No. 86,046
19 Claims. (Cl. 346—1)

The present invention is generally concerned with a system for recording at a central point data concerning events occurring at one or more remote points; more particularly with method and means for recording at one point information gathered at one or more remote points in a manner which is adapted to provide a relation of the occurrence of events to time and also to provide rate data based on time or on some other variable having a fixed relation to time; and specifically there is here disclosed a carrier current system, method and means, of the general character and for the purposes described, as used for electric utility load studies or metering.

Systems for transmitting distinct sets of information to a remote single station for recording the same individually are well known to the prior art, as evidenced for example by the Swartzel et al. U.S. Patent 2,494,370, Rawlins U.S. Patent 2,904,682, and Cleaver et al. U.S. Patent 2,640,973 and the Atkinson et al. U.S. Patent 2,574,458 and by certain of the prior art cited therein. The use of the carrier current transmission of data or information on the occurrence of an event or change of variable or variables measured, observed, or monitored at one or more locations and recorded at one central receiving station is also well known as evidenced, among other patents and publications, by the aforesaid Atkinson and Cleaver patents, Shepard U.S. Patent 2,312,127 and certain of the prior art therein cited.

The present invention, under one broad aspect of what is considered to be novel, proposes generating and transmitting a signal of characteristic frequency at each monitored point, upon the occurrence there of a specified event or condition, to a central point of reception and recording, where it is used ultimately to apply the output of a continually operating corresponding pulse generator to a respective channel of a recording device having also a channel for recording locally generated time identifying or correlating pulses. One broad band receiver is used for all such transmitted signals, its output being commonly applied to filter means comprising a set of sections or networks, each passing only that part of the receiver output— corresponding to a particular transmitted signal—to a respective channel or circuit of control means to switch the output of a corresponding pulse generator into its channel in the recording device. Although radio (i.e., electromagnetic radiation) transmission may be used, in the specifically disclosed or embodiment of the invention, carrier current transmission is used from the remote monitoring or metering points to the receiving-recording center.

Thus on a suitable recording medium, magnetic or paper tape for example, time pulses locally generated at a pre-set rate and applied to a longitudinal time channel on the tape, serve to identify the relative time of occurrences and durations of an event at a monitored point for which a record is produced in another longitudinal tape channel; the actual time being available from information respecting the time at which the recording began. Further, where the event recorded in a tape channel is, for example, the operation of a constant delivery pump or of a constant rate of energy consumption device such as an electric lamp, and there is used a related pulse generator having a pulse frequency proportional to the pump delivery or energy consumption rate, information may be retrieved through suitable play-back and counting means (such as that disclosed in our U.S. Patent No. 2,960,266) in terms of overall amount of fluid delivery or energy consumption over a period or sub-periods of recording, or in terms of fluid or energy rates or demands at various times of the record. The pulse generation of all pulse generators is not necessarily proportional in the sense of having a common proportionality or "meter" constant related to a time or linear-function-of-time basis, but only rather that each generator produces pulses at a rate having a known relation to a rate involved in the event effecting operation of a corresponding transmitter. As to record medium, for some situations magnetic tape is preferred, since with it (see our herein mentioned patent) greater flexibility of studied time intervals is possible, for such may differ from the time interval of the basic record.

Under another aspect of the disclosure, there is believed to be present multiple inventive novelty by the provision (a) of a system adapted to use of a miniaturized form of transmitter, conducive to ease of and relatively inconspicuous installation at the site of an operation or variable to be monitored or metered and (b) adapted to be powered from an electric utility line used for carrier current transmission.

In the specific form of the invention hereinafter described, at each station or location of an event or variable to be monitored or metered, there is a transmitter operating noiselessly on minimum power derived from an electrical power line and transmitting into the line a signal received at a remote recording station, which transmitter is set into operation by, and for the duration of, an event or operation monitored or metered. More particularly the disclosed system is one observing the operation of devices utilizing power from the supply line, such as an electrical utility line in a residence, plant or other building for in effect transmitting to a central recording location information on the load utilization or demand upon the utility system.

The invention is described in a particular form where it is desired over a period of time to obtain information on electrical energy utilization by various types of loads, namely, within a typical residence, the demand or load pattern upon the utility system by resistance loads such as lamps, electric ranges or by other types of loads throughout the average day.

Taking a typical residence as an example for this particular purpose, as many as forty individual transmitters might be located at various outlets throughout the domicile, which individually respond to demands at their respective outlets and transmit signals on the operation of the individual loads at such outlets on the utility system to a central recording station, which may be in or outside of that particular installation. Not only lamps and receptacles or outlets for appliances or other uses in a domicile may be provided with transmitters, but also the built-in systems of illumination or other means of electrical energy utilization may be so furnished with transmitters, at locations such as wall switch boxes; or the receptacles themselves which are used for particular types of appliances or other sources of energy utilization may include such transmitters. For such an arrangement a transmitter is used responsive to the operation of each item of equipment or electrical energy utilization desired to be monitored, the transmitter being connected to the electrical supply line both for its own operating power and for transmission of its particular signal to a common reception center.

The system as such is quite flexible. By the use at each outlet or receptacle of a plug-in type transmitter into which in turn the lamp or other appliance is plugged, upon use of the lamp, appliance or other serviced device, a signal is transmitted into the line at a respective distinct frequency indicating the operation of the same.

In the case of built-in lighting or other built-in means of utilizing electrical energy a transmitter, likewise a miniaturized transmitter, is installed in a switch box or other location in the circuit responding to energy utilization to transmit a signal indicating the operation of the particular load. As a further means of responding to energy utilization, particularly by electric illumination devices, there may be used and is here disclosed a transmitter plugged into a receptacle or otherwise connected to the energy supply line and responsive to and set into operation by radiation from the load, such as a transmitter incorporating a photo-electric cell, which sees a particular lamp or radiating source or is responsive to some other physical change attendant upon the operation of the device monitored.

In any event, in such a system all the transmitters provide signals of discrete frequencies for each load to a common receiver, applying an audio frequency output to a multi-channel filter network furnishing a distinct audio frequency output channel for each load which it is desired to measure or monitor; the output of the receiver being comprised of components of distinct frequency for each operating transmitter. The output of each channel then is applied through suitable amplifying and rectifying means to operate a corresponding relay means switching on and off to a recording head channel the signal or pulses of a corresponding continuously operating pulse generator, having a pulse frequency correlated to the load level monitored by a specific transmitter device.

On the other hand the respective channel outputs of such a system could conceivably be fed to individual recorders at the central station such as tape recorders or chart recorders, and where chart recorders are used with the rate of chart progression correlated to time, itself providing a time co-ordinate on the chart itself, the generation and recording locally of time impulses would be unnecessary.

The record derived from such a system may be set up and utilized in various ways. For example, the outputs of several pulse generators could be applied to one common tape or recording device in respective channels or if desired to separate tapes, in each case the tape preferably having a time impulse channel for use in data translating to establish independently of tape speed the load or energy demand, or unequivocally over a selected period of time the total energy used. The final record, for example in the case of a magnetic tape may be either translated into a punch card form useful for, or fed directly as the input into a computer for load studies, demand studies, or total energy use for billing purposes.

Although the system, method and means, is hereinafter described for a specific application of electrical utility load and energy consumption studies or measurement, it is to be understood that in broader aspects the present invention is applicable to other situations. Thus when one or more pumps, or valves, are operated to deliver a fluid to respective consuming points at known rates, the operation of a pump or of a valve will serve to trigger for a corresponding period a respective transmitter whereby at the recording station the proportional output of a corresponding pulse generator is applied to a corresponding and distinct channel in the record.

Among other and quite diversified applications might be mentioned the monitoring of TV viewing. This may take various forms. Individual residential installations may be provided wherein, for example, a plug-in type transmitter interposed between the outlet and the television set plug is connected to the television channel switch in such manner as to operate only when a particular channel is used. Signals so obtained then would be effective to switch on into a recording device remotely located pulse generating signals indicating the operation of the set on the selected channel in a manner specifically related to time pulse signals applied to the tape. In another form of application for television viewer monitoring, it is possible that a component of the transmitting device be conneced to the channel switch to be distinctly modified for each channel and thereby transmit a distinct signal to the receiving station identifying the channel then in use, which would of course be correlated with a time impulse or identifying channel.

A general object of the present invention is then the provision of a data and information transmitting system wherein the occurrence or duration of an event at one location serves to trigger the application of the output of a continuous rate pulse generator, correlated in an identifying or measuring sense to the transmitting location or event, to a recording device in a manner identified or identifiable with respect to time or as a rate with respect to time.

Another object of the present invention is the provision of a system and means for recording at one point data or information on events occurring at one or more remote points, which is adapted for ease of installation by rugged devices subjecting the system to minimal chance for malfunction and is adapted to be readily changed from one location to another. A further object is to provide a system which is adapted for low-power electromagnetic radiation or carrier current transmission of data concerning the occurence and continuation of events from one or more points to a remote receiving and recording location. A still further object is the provision for the purposes described of compact and inconspicuous transmitters, at each of the points of data observation or monitoring.

A still further object of the present invention is the provision of a system which will record, at a relatively remote location from the site or location of an event monitored, a rate involved in the event with respect to another variable having a known relation to time.

Other objects and advantages will appear from the following description and the drawings wherein:

FIG. 1 is a generalized or block diagram illustrative of one embodiment of the invention;

FIG. 2 is a schematic diagram of one form of transmitter circuitry adapted for miniaturization and therefore as a relatively inconspicuous transmitter, plugged into an outlet or receptacle and in turn itself serving as the receptacle for the plug of the lamp or other appliance to be monitored;

FIG. 3 is a schematic diagram of a transmitter responsive to a change in physical condition arising substantially instantaneously upon the operation of the load device monitored, here specifically to radiation such as light.

Figure 4:
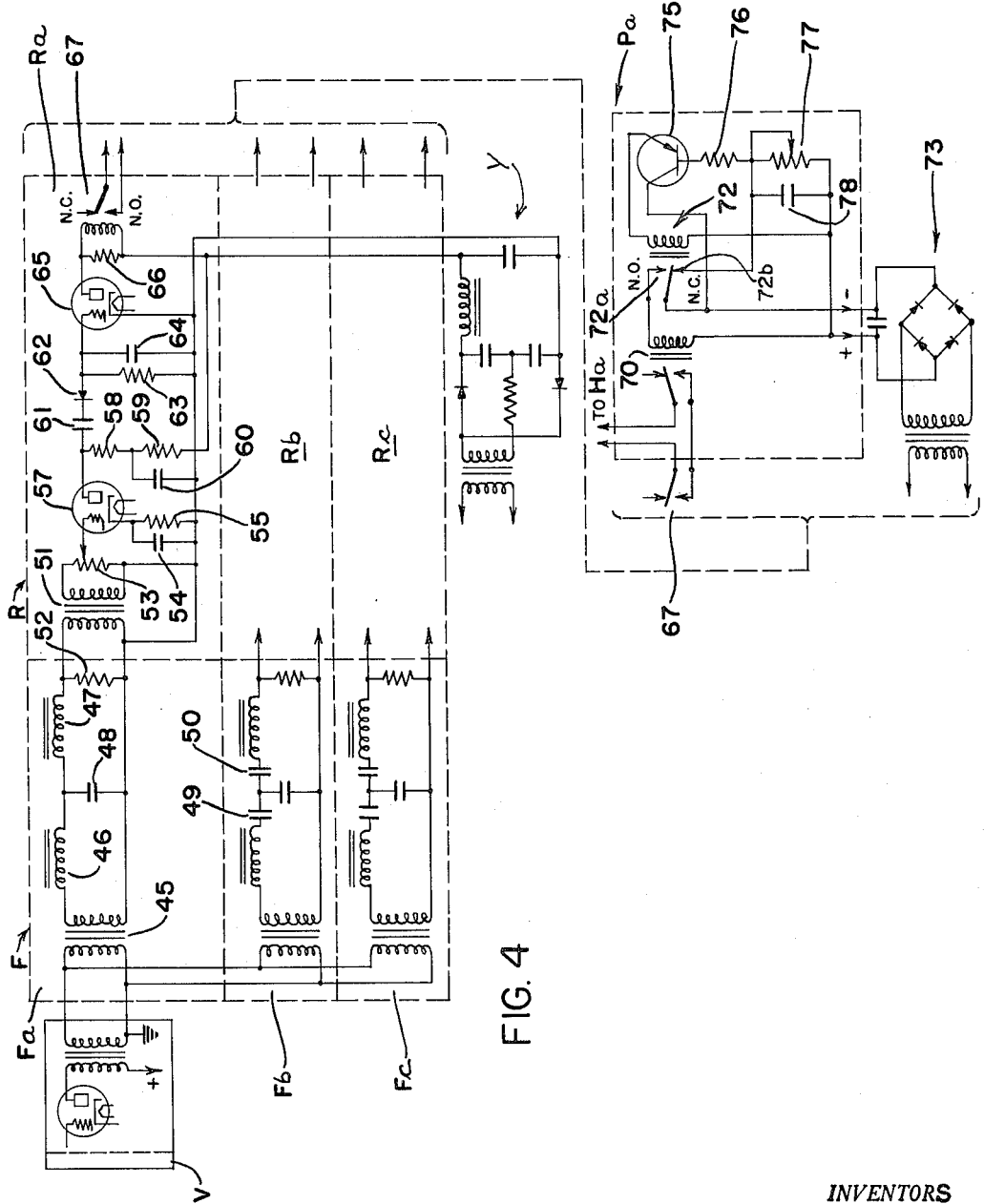
FIG. 4 is a partially schematic, and partially block diagram for the receiving end of the system as generally indicated in FIG. 1.

One embodiment of the broader aspects of the invention is disclosed in FIG. 1 for a carrier current system of transmission wherein $Xa$, $Xb$, $Xc$ are transmitter units deriving operating power or energy from and transmitting into an electric power line L their respective output signals, which are received through suitable coupling means by a broad-band receiver V. Each transmitter operates at a separate and distinct radio frequency, relative to a common base frequency, providing a frequency band to which the device V is receptive. The receiver provides radio frequency amplification of the incoming signal or signals, and mixing of a locally generated signal say equal to the base frequency to provide an output including for each transmitted signal an audio-frequency output component corresponding to the difference of the transmitted signal from the base frequency.

The output of the receiver is then applied to a filter network F, having respective sections or channels each adapted to pass, or tuned to, a frequency corresponding to the difference in frequency of a respective transmitter from the selected base frequency of the operating system. The respective outputs of the filter sections Fa, Fb, and Fc are applied to respective channels or sections Ra, Rb, Rc, of control or relay means R which in turn control the application of the output of continually operating pulse generators Pa, Pb, Pc to the corresponding sections Ha, Hb, Hc of a magnetic recording head H applying signal pulses to distinct parallel linear channels A, B, and C of a magnetic tape M. The pulse generators are each set at a frequency proportionate to or corresponding to a known or assumed wattage or volt-ampere load of the energy consuming devices monitored or observed by the corresponding transmitters. Furthermore, at the recording station or receiving station there is provided a local time pulse generator Pt which through a corresponding section of the recording head Ht or a separate head applies time pulses on the magnetic tape in a distinct linear channel T.

Thus with time pulses applied in the time channel T of the recording medium such as a tape at successive equal time intervals and with load impulses applied in each load data channel having a specified relation to the known or assumed wattage or volt-ampere load demand of the device monitored, or a known relation of the time impulse designations in the time channel to calendar time, there is provided a record translatable, as described in our aforementioned patent, into overall energy consumption for each channel, or for purposes of load study on a utility system, a record of energy demand for each appliance at all periods throughout the day.

Assuming for example a seven megacycle base frequency for operation, Xa, Xb, Xc might have a 7 mc.+300, 7 mc.+900 and 7 mc.+2,700 transmitted frequencies. The receiver V may then convert the signals from the line into a composite lower frequency output covering, for example, the band from 300 to 10,000 cycles. This output being applied to the filter means F, each filter section Fa, Fb, Fc will provide, during the time of operation of the related transmitter, an output which at a control means with suitable amplification and rectification as hereinafter described is suitable to energize switching means applying the proper pulse generator output to a recording head section.

In FIG. 2 appears in schematic form a signal generator or transmitter adapted for use in this system and to be embodied in a miniaturized inconspicuous plug-in form by utilization of commercially available miniature components (for a physical form having dimensions on the order of 2½ inches long and 1¼ inch diameter, and a few ounces weight) or of sub-miniature components. At opposite ends of a suitable casing are located the male or line plug or screw-in element 20 and a load socket 21, adapted respectively for example to be inserted in an A.C. outlet or receptacle and to receive the cord plug of a load, between which current is passed by conductors 22, 23, the latter including the preferably low impedance primary of a transformer 24 as a power coupling device. The transformer secondary winding with one side connected directly by conductor 29 to the emitter of transistor 25 and the other to the transistor base through a solid state rectifier diode 26 and resistors 27 and 28; the filter capacitor 30 connected from a point between diode 26 and resistor 27 to conductor 29; and the voltage regulating Zener diode 31 connected from a point between resistor 27 and base bias resistor 28 to conductor 29; comprise an automatic voltage-regulated rectifying and filtering circuit providing power for operation of the transmitter. The oscillator frequency controlling quartz crystal 32 connected between the transistor base and collector, and the inductance coil 33 connected between the collector and the positive side of the power supply (i.e., a point between resistors 27, 28), with the variable output coupling capacitor 34 connected from the collector to line conductor 22, leading to the ungrounded side of the supply line, comprise the rest of the transmitter.

Hence upon turning on a load 35, such as a lamp plugged into the transmitter socket 21 by operation of lamp switch 36, the transmitter is energized by load current flowing through the primary of transformer 24, and the RF energy produced in the tank circuit provided by resistor 28, coil 33 and the emitter and base under the frequency control of crystal 32, is coupled through capacitor 34 to line 22 and, because of the frequencies involved, capacitively through windings of transformer 24 to line 23. Setting of capacitor 34 serves to obtain most efficient coupling. The signal generator circuitry of FIG. 2 is also adaptable for a unit to be included in the box of a wall switch (or even the load device itself) with the transformer primary inserted in a line conductor controlled by the switch or supplying the receptacle and with capacitor 34 coupling into the same line 23, the conductor 22 not then appearing.

As a variant on a system herein described using transmitters of the type described for FIG. 2, in a situation where separate circuits are used for each separately operable load, several transmitters may be used at one location, such as a distribution panel box in a preferably inconspicuous place. Also even for individual load points for which the load may assume "stepped" values as in the case of a three-way lamp, there may be used a transmitter device of plural frequency output, wherein the device is actuated by each "step" load value to produce a signal of distinct frequency, and thereby switch a selected one of a plurality of pulse generators into one recording head section.

In FIG. 3 there is represented, in manner similar to that of FIG. 2, a transmitter adapted again to embodiment in inconspicuous form and to be plugged into or otherwise connected to the power supply line at a location where it will see radiant energy, such as light, arising upon operation of a load to be monitored. Elements analogous to those in FIG. 2 are designated by like numerals, and the oscillator circuit is essentially identical. However, a transducer, such as a small cadmium sulfide photocell 40 juxtaposed to a window or opening in the transmitter casing, is used to sense the operation of the load. One prong of the plug 20 is connected by the conductor 29 to the transistor emitter, and the other through conductor 39 to rectifier diode 26 between which and one side of the winding of potentiometer 41 is connected in series the photocell 40. The other side of the potentiometer is joined to conductor 29 and its slide arm commonly with one side each of filter capacitor 30 and Zener voltage regulating diode 31 to the base bias resistor 28. The potentiometer setting serves to determine as needed the response of the transmitter to the necessary level of radiation for operation and thereby transmittal of the generated signal through coupling capacitor 34 to conductor 39 and to the power line in the manner previously described for FIG. 2. But alternatively a heat sensitive device for example might be used, such as a thermocouple network or element.

Because of the relative small use of D.C. distribution systems the aforegoing transmitters, with a transformer as the power coupling device, are detailed as preferred forms, rather than D.C. transmitter units using a low value resistor in position corresponding to the primary as the power coupling device, across which a low D.C. voltage is developed and automatically regulated by Zener diode means without need of the rectifier and filter circuitry.

FIG. 4 illustrates the receiving and recording end of the system, V being the broad band receiver coupled to the utility power line and having its output stage coupled to each of the sections Fa, Fb, Fc of the filter means F. Although a commercially available Collins 75–A–4 receiver has been successfully used, simplified receiver circuitry could obviously be sufficient; and a transistorized version could be used if indicated by space or power requirements. Each section of the filter F includes a transformer 45 to the primary of which the output of V is applied with the secondary connected through an appropriately tuned, here a T-type, network (comprising for the low-pass 300 cycle output channel or section the inductances 46, 47 and capacitor 48) across a resistor 52 to a respective section of control or relay means R. The other band-pass sections of F are of course modified as may be expedient to obtain tuning to other receiver output components corresponding to the distinct frequencies of the monitoring transmitters, as by change of the values of inductances or capacitor corresponding to 46, 47, 48 and by the inclusion of capacitors as at 49, 50 in section Fb. The last section may of course be a high-pass filter.

In the control means R, each section may be similar to that shown in detail for Ra, comprising a coupling or input transformer 51 with primary bridged by the resistor 52, and secondary bridged by a sensitivity adjusting potentiometer 53, whereof one end of the resistance winding is connected as shown, to the primary of 51 to the negative or ground side of power supply Y, and, through bypass capacitor 54 and bias resistor 55, to the cathode of a triode vacuum tube 57 with the potentiometer arm or slide connected to the grid of 57. The plate of tube 57 is connected through the total resistance of load resistor 58 and isolating resistor 59 to the positive side of a power supply, with the bypass capacitor 60 connected between ground and the common point of 58, 59.

The output of the above described amplifier circuitry of tube 57 developed across resistor 58 is applied through the coupling and rectifying network comprised of coupling capacitor 61, diode 62, the resistor 63 and capacitor 64 to the grid-cathode circuit of the second triode tube 65 to produce, when the corresponding transmitter—therefore load—is operating, a direct current output across the load resistor 66 which, being supplied to the solenoid of relay 67, closes the contacts thereof to apply the output of the continuously operating pulse generator Pa to a corresponding section of the recording head, or a separate recording head. Here again the vacuum tube circuitry could be modified for transistor operation.

The pulse generators Pa, Pb, Pc are essentially identical and comprise the components shown in FIG. 4 and here described for Pa. The actual pulse generation may be considered under one aspect as the continual mechanical action of the opening and closing of the contacts of a relay or solenoidally operated switch 70, which are connected in series with a charged capacitor in the recording unit, the contacts of relay 67 and a corresponding channel or section of the recording head H, the opening and closing of 70 and rate thereof being determined by the circuitry to be described. A power source, such as the full wave rectifier 73 for energization of the solenoid of 70 and of a timing circuit has one side, the positive side, connected directly to one end of the solenoid in 70, and other side to the collector of a transistor 75 and to the movable contact arm of a bi-polar solenoidally operated relay or switch 72, so that with the remaining side of the solenoid in 70 connected to the fixed contact 72a, upon each closure on 72a, the contacts in 70 are closed, presenting in effect a constantly generated signal available to be applied to Ha when Xa is transmitting and therefore holding 67 closed.

To effect the opening and closing of the circuitry through contact 72a, one end of the solenoid in 72 is connected to the positive side of 73, and the other end to the emitter of transistor 75, of which the collector is connected to the negative side of the power supply, and the base, through base bias resistor 76 in series with the RC timing network, comprised of the parallel connected resistance winding of potentiometer 77 and capacitor 78, back to the positive side of supply 73. The common point of 76, 77 and 78 is connected to the slide arm of 77 (for variation of the network time constant) and to the fixed contact 72b.

In this arrangement, with relay 72 closed upon 72b, capacitor 78 charges to a point where the emitter-collector circuit conducts (to energize the solenoid in 72 opening 72b and closing on 72a to cause switch movement or pulse at 70) until the pre-set timed discharge of 78 cuts off conduction causing 72 to open at 72b and close upon 72a; which as a timed repeated action produces the described type of pulse generation for application to the recording head.

The time pulse generator preferably is comprised of a known type including electric contacts actuated, by an electric clock or synchronous motor-driven cam means, to discharge a charged capacitor into head channel Ht giving a time pulse at pre-selected intervals and in the intervening open contact time to permit the capacitor to recharge from a current source such as a rectifier circuit.

Obviously under the broad aspects of the system other forms of pulse generators, filter networks and control means might be used; so also other types of recording heads adapted to a desired record medium other than magnetic tape; and also other forms of transmitters. Further at the receiver a noise amplifier could be used with proper phase relation to cancel unwanted noise outside the band used.

We claim:

1. A method for recording an event, which may occur at one place, at a relatively remote station, comprising: sensing the occurrence of said event and producing and transmitting in response thereto a signal corresponding in duration to the duration of said event; continually generating at said station pulses for affecting recording on a recording medium; at said station, receiving and transforming said signal; and utilizing the transformed signal to control application of said pulses to said medium for the duration of said signal.

2. A method as set forth in claim 1 wherein: events occurring at a plurality of places are sensed for transmitting to said remote station said signals for application to respective distinct recording channels of said medium and a signal of distinct frequency is produced at each said place; and for each said place there are generated such said pulses descriptive of the event there sensed.

3. A method as set forth in claim 2 for recording data concerning pre-selected events which may occur at each said place, wherein: said pulses are generated corresponding in frequency in an identifying manner to each said event.

4. A method as set forth in claim 3 wherein: there are continually generated and recorded on said recording medium in a distinct channel pulses equi-spaced time-wise.

5. A method as described in claim 4 adapted to utility load investigations with each said place having a local load the operation whereof is the sensed event, and wherein the said pulses corresponding to each said load have a rate proportional to the load.

6. A method as described in claim 5 wherein signals are transmitted from the places where the events are sensed to the recording station by carrier current transmission over electrical lines of a common electrical power system supplying said station and places.

7. A system for monitoring a plurality of stations and producing at one station a distinct rate record of an event which may occur at the respective monitored station comprising: a radio-frequency transmitter at each monitored station adapted to be actuated upon occurrence of the event to be recorded and to transmit for the duration of the event a signal of distinct frequency; a broad band receiver at the recording station adapted to receive the signals from all said transmitters and produce an amplified output of audio frequency range having a distinct frequency component corresponding to each said transmitter; filter means accepting the receiver output and having a plurality of sections each adapted to pass a frequency component corresponding to a respective transmitter; recording means at the recording station including a recording head and means for continuous transport of a recording medium by said head, said head having a section corresponding to each transmitter for recording in a respective channel of said medium; pulse generating means for each head section continuously operating at a rate proportional to an assumed rate involved in an event monitored at a corresponding station; and control means receiving the output of a corresponding filter section and adapted to connect a respective pulse generator to a recording head section.

8. A system as described in claim 7 including a time pulse generator continually applying through said recording head to a time pulse channel in the recording medium time pulses generated at a constant time rate.

9. A system as described in claim 8 wherein each said station is coupled to a common electrical power supply system for carrier current transmission of signals from each monitored station to said one station.

10. A system as described in claim 7 wherein each said station is coupled to a common electrical power supply system for carrier current transmission of signals from each monitored station to said one station.

11. A system as described in claim 7 for recording data related to operational load demands of an electrical utility system, wherein at least one of selected load points is connected through a transmitting device to the utility system for derivation of load operating power, and the corresponding transmitting device includes a crystal controlled oscillator and is adapted to become operational upon drawing of power therethrough.

12. A system as set forth in claim 11 wherein a time pulse generator continually applying through said recording head to a time pulse channel in the recording medium time pulses generated at a constant time rate.

13. A system as set forth in claim 12 wherein each said station is coupled to a common electrical power supply system for carrier current transmission of signals from each monitored station to said one station.

14. A system as described in claim 7 for recording data related to operational load demands on an electrical utility system, including a radiant energy sensing device adapted to set a respective transmitter into operation in response to radiated energy from a load point of said utility system.

15. A system for recording at one central recording point or station on one recording medium information related to events occurring at a plurality of monitor stations, comprising: at said central station a multi-channel recording head, means for transporting by said head said recording medium, means at said central station for generating at constant rate time pulses continually applied to a time channel of said medium through said head, and means producing series of pulses, each series generated at a respective constant rate proportional to a rate involved in an event which may occur at a respective monitor station, the last said means being applicable through said head to record on respective channels of said medium; a transmitter at each said monitor station responsive to occurrence of the event there monitored to produce a transmitted output signal of distinct radio frequency; a broad band receiver at said central station for receiving signals from all said transmitters and providing a distinct frequency component in its output corresponding to each transmitter; and means accepting the output of said receiver including filter means for applying respective series of pulses through said head to channels of said recording medium.

16. A system as described in claim 15 wherein at least one transmitter is a transmitter unit adapted to inconspicuous plug-in installation at an electrical energy supply outlet and in turn to receive the power cord plug of one of said devices; said unit including plug means adapted to said outlet and receptacle means for the power cord plug, the two last said means being connected by conductors for passage of power to the device; a crystal controlled oscillator circuit providing said output signal upon application of a power supply demand by said device; means including a power coupling device having a conductive portion included in one of said conductors, adapted to provide a transmitter direct current power supply energized upon drawing of power by said one device through the unit.

17. A system as described in claim 16 wherein the output of said oscillator is coupled to a second said conductor, and thereby to the electric line servicing said outlet as a carrier current transmission line.

18. A system as described in claim 16 including: as said power coupling device a transformer having a primary as said conductive portion and a secondary; and rectifying and filter circuit means connected with the secondary.

19. A system as described in claim 16 including automatic voltage regulating means interposed between said power supply and oscillator circuit.

References Cited by the Examiner

UNITED STATES PATENTS

| | | | |
|---|---|---|---|
| 2,385,673 | 9/1945 | Woodworth | 340—310 |
| 2,393,021 | 1/1946 | Cheek | 340—163 |
| 2,449,391 | 9/1948 | Kogane | 340—171 |
| 2,539,553 | 1/1951 | Rich | 346—33 |
| 2,592,737 | 4/1952 | Reynolds et al. | 340—183 |
| 2,610,241 | 9/1952 | Eichorn | 340—310 |
| 2,753,546 | 7/1956 | Knowles | 340—183 |
| 2,773,734 | 12/1956 | Norman | 346—49 |
| 2,784,393 | 3/1957 | Schultheis | 340—185 |
| 2,847,268 | 8/1958 | Cowper | 346—49 |
| 2,930,003 | 3/1960 | Wilson | 331—116 |
| 2,992,399 | 7/1961 | Van Tassel et al. | 331—116 |
| 2,996,348 | 8/1961 | Rosenberg | 346—49 |

LEO SMILOW, *Primary Examiner.*

NEIL C. READ, *Examiner.*